United States Patent [19]
Diner

[11] Patent Number: 5,331,413
[45] Date of Patent: Jul. 19, 1994

[54] ADJUSTABLE CONTROL STATION WITH MOVABLE MONITORS AND CAMERAS FOR VIEWING SYSTEMS IN ROBOTICS AND TELEOPERATIONS

[75] Inventor: Daniel B. Diner, Pasadena, Calif.

[73] Assignee: The United States of America as represented by the United States National Aeronautics and Space Administration, Washington, D.C.

[21] Appl. No.: 954,109

[22] Filed: Sep. 28, 1992

[51] Int. Cl.$^5$ .............................................. H04N 7/18
[52] U.S. Cl. .................................... 348/159; 395/94; 901/47; 348/114; 348/143
[58] Field of Search ................. 358/87, 101, 103, 108, 358/210, 229, 254, 93; 901/47; 395/94; H04N 7/18

[56] References Cited

U.S. PATENT DOCUMENTS

| | | | |
|---|---|---|---|
| 3,951,271 | 4/1976 | Mette | 224/1 CM |
| 4,340,878 | 7/1982 | Spooner et al. | 358/103 |
| 4,395,731 | 7/1983 | Schoolman | 358/88 |
| 4,543,609 | 9/1985 | Smith | 358/210 |
| 4,544,952 | 10/1985 | Cang | 358/210 |
| 4,559,555 | 12/1985 | Schoolman | 358/88 |
| 4,613,942 | 9/1986 | Chen | 364/513 |
| 4,672,435 | 6/1987 | Gluck | 358/108 |
| 4,706,117 | 11/1987 | Schoolman | 358/88 |
| 4,706,120 | 11/1987 | Slaughter et al. | 358/103 |
| 4,713,685 | 12/1987 | Nishimura et al. | 358/103 |
| 4,833,624 | 5/1989 | Kuwahara et al. | 364/513 |
| 4,837,734 | 6/1989 | Ichikawa et al. | 364/513 |
| 4,853,687 | 8/1989 | Isomura et al. | 340/825 |
| 4,853,771 | 8/1989 | Witriol et al. | 358/93 |
| 4,870,561 | 9/1989 | Love et al. | 364/192 |
| 4,992,866 | 2/1991 | Morgan | 358/108 |
| 5,040,055 | 8/1991 | Smith | 358/254 |
| 5,124,805 | 6/1992 | Chung et al. | 358/254 |
| 5,182,641 | 1/1993 | Diner et al. | 358/103 |

OTHER PUBLICATIONS

S. G. Hart, et al., The Effects of Stimulus Modality and Task Integrality: Predicting Dual-Task Performance and Workload from Single-Task Levels, Proc. of 21st Annual Conf. on Manual Control, Ohio St. Univ. Columbus, Ohio 1985.

Primary Examiner—Tommy P. Chin
Assistant Examiner—Bryan S. Tung
Attorney, Agent, or Firm—John H. Kusmiss; Thomas H. Jones; Guy M. Miller

[57] ABSTRACT

Real-time video presentations are provided in the field of operator-supervised automation and teleoperation, particularly in control stations having movable cameras for optimal viewing of a region of interest in robotics and teleoperations for performing different types of tasks. Movable monitors to match the corresponding camera orientations (pan, tilt and roll) are provided in order to match the coordinate systems of all the monitors to the operator internal coordinate system. Automated control of the arrangement of cameras and monitors, and of the configuration of system parameters, is provided for optimal viewing and performance of each type of task for each operator since operators have different individual characteristics. The optimal viewing arrangement and system parameter configuration is determined and stored for each operator in performing each of many types of tasks in order to aid the automation of setting up optimal arrangements and configurations for successive tasks in real time. Factors in determining what is optimal include the operator's ability to use hand-controllers for each type of task. Robot joint locations, forces and torques are used, as well as the operator's identity, to identify the current type of task being performed in order to call up a stored optimal viewing arrangement and system parameter configuration.

9 Claims, 3 Drawing Sheets

ADJUSTABLE CONTROL STATION WITH MOVABLE MONITORS AND CAMERAS FOR VIEWING SYSTEMS IN ROBOTICS AND TELEOPERATIONS

ORIGIN OF INVENTION

The invention described herein was made in the performance of work under a NASA contract, and is subject to the provisions of Public Law 96-517 (35 USC 202) in which the contractor has elected not to retain title.

TECHNICAL FIELD

The present invention relates to real-time video presentations in the field of operator-supervised automation, robotics and teleoperation, and automated control of the configuration of system parameters and arrangement of cameras and monitors for optimal viewing performance, particularly with control stations having movable cameras for viewing a region of interest or workspace.

BACKGROUND ART

In a teleoperator work station where movable cameras are viewing the workspace, any panning, tilting or rolling of the cameras causes a misalignment between the coordinate system of the camera and the coordinate system of the operator viewing the monitor. For example, if the camera pans 15° to the left, the "straight ahead" direction on the monitor will actually be 15° to the left. If a robot hand controller is pushed "forward," the robot will move forward but will be seen on the monitor to move at an angle of 15° to the right. This causes the operator to continuously need to mentally transform coordinates during operation, thus causing an increase in workload as well as an increase in the probability of operator error. If several movable cameras are presenting their images to several monitors, each may require a different coordinate transformation. The increase in workload and probability of operator error may well become unmanageable and dangerous.

Another problem in teleoperation is that operators have different individual characteristics which play a role in performing different tasks. When performing a task of a particular type, one operator may perform best when the cameras are arranged to provide three right angle views of the workspace. Another operator may prefer a standard perspective-projection view and thus place the cameras and monitors to provide that view. One operator may desire the hand controller to have a large gain, i.e., to have small hand-controller motions cause large remote robot manipulator or vehicle motions. Another operator may desire a smaller gain, making up in precision what is lost in velocity. One operator may prefer the monitors to be located on a plane, closely packed together and facing the operator while another operator may prefer the monitors to be located on a virtual sphere, facing inward toward the center of the sphere with the operator's head located at the center of the sphere, etc. Still other arrangements of cameras and/or monitors and assignments of specific camera images to specific monitors may prove to be advantageous for different operators.

Considering that people fall into distinct categories, particularly in terms of perception and physical performance (left brain versus right brain, stereo blind versus high stereo acuity, etc.), it is quite unreasonable to assume that one arrangement of cameras and monitors can provide all operators with what they need to optimally perform a wide variety of tasks. It would be desirable to determine which arrangement of multiple cameras and monitors, and which configuration of control station parameters, e.g., hand-controller gain, yields optimal performance for each type of task for each individual operator. The optimal conditions to be set up include not only the viewing arrangement, i.e., position and orientation of the cameras but also assignments of monitors to cameras and the configuration of system parameters.

Once the optimal viewing arrangement and configuration of system parameters is determined for each type of task for each operator, it would be further desirable to have the control station computer set up the optimal viewing arrangements and configurations of system parameters automatically for each type of task for each operator in order to facilitate shifting from one type of task to another and to facilitate changing operators.

STATEMENT OF THE INVENTION

In accordance with one aspect of the invention, each monitor is mounted on an automated platform which pans, tilts, rolls and shifts to match the viewing angle of the camera whose image it is displaying. Thus, in the example given above, the monitor would be panned 15° counterclockwise (looking downward through the vertical), and shifted through a 15° arc to the left about the center of the operator's position so that the operator views the monitor perpendicularly. If now the hand controller is operated "forward," the camera will see the robot move 15° to the right, and the monitor will show the robot move 15° to the right on the screen, but the monitor is shifted through an arc 15° degrees to the left so that the robot motion is presented to the operator as being in the forward direction. In this manner, the operator does not need to transform coordinates at all.

In accordance with another aspect of the present invention, a method is provided for automatically setting up a control station for one or more robots with an optimal viewing arrangement of cameras and monitors, and configurations of system parameters (e.g., hand-controller gain and coordinate transformation), for each operator. The method includes testing each operator's performance of each type of task with different combinations of viewing arrangements of cameras and monitors, and configurations of system parameters, and selecting as the optimal viewing arrangement and configuration of parameters that arrangement and configuration which yield the best performance of the operator for each type of task. The testing of each task with each viewing arrangement and configuration of parameters is repeated a number of times to allow for learning as a factor, and the sequence of repetition may be altered in order to factor in both fatigue and task performance interactions as elements in determining the optimal viewing arrangement and configuration of parameters. In certain circumstances (discussed below), it may be desirable to transform the hand-controller coordinates.

The optimal viewing arrangement and configuration of parameters for each task type determined for each operator is stored by a control station computer in a corresponding table for each operator. In operation, the operator may identify the corresponding table to be used by the control station computer for automatically setting up the viewing arrangement and configuration of parameters that is optimal for each task to be performed by the operator. Alternately, as the operator performance progresses from one type of task to another, hand-controller and robot joint locations and forces and torques may be used to identify each type of task for selection of the optimal viewing arrangement of cameras and monitors and the corresponding configuration of parameters. Although this selection is made automatically by the control station computer, the operator may override the selection, as through any input device such as a voice command or a thumb button switch on the hand controller. When there is such an override, the operator may enter any arrangement of cameras and monitors and configuration of parameters, stored or otherwise.

DETAILED DESCRIPTION OF THE INVENTION

Camera systems and control stations can be built such that all their key features are variable and under computer control. Then these variables can be automatically adjusted by the control station computer to previously determined optimal performance configurations for the currently identified operator and type of task to be performed. Cameras and monitors can be individually mounted for more universal freedom in selecting viewing arrangements with hand-controller coordinate transformations, hand-controller gain and other parameters, all under computer control, so that one control station can assume many viewing arrangements and parameter configurations and thus extend the capability of the operator in the system. One viewing system that could be used is a spherical projection screen and system. The projection of each monitor image is then relocated accordingly. A helmet-mounted display could also be used.

In most teleoperator applications, particularly in space, undersea, and nuclear applications, only a small group of operators is available, and a high level of performance from each operator is highly desired for each type of task, so that any task may be performed by any available operator without having to select a particular operator for a particular task.

Figure 1:
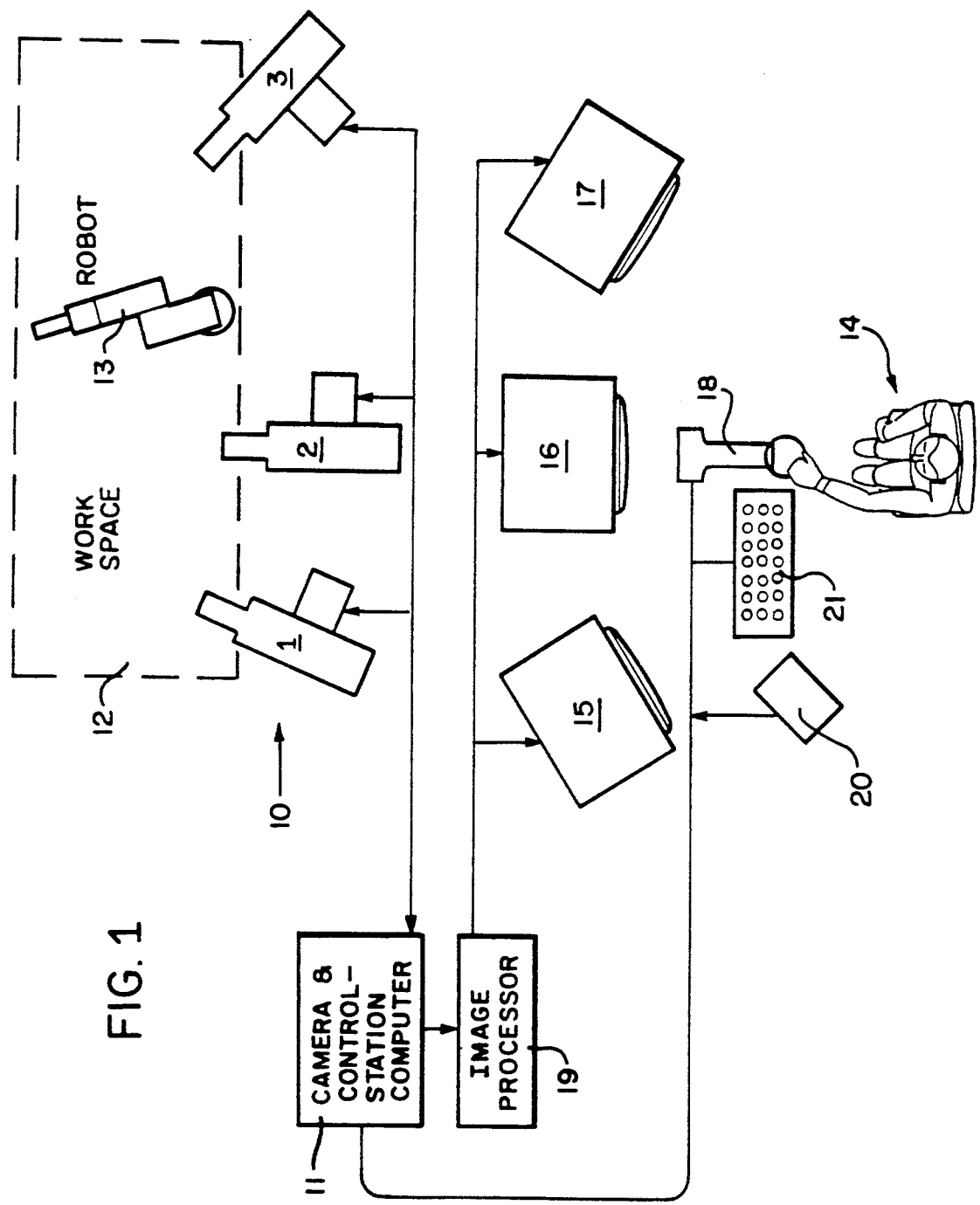
FIG. 1 illustrates a control station for one or more robots with multiple cameras and monitors, a camera and control station computer for automated control of the control station parameters, the camera positions and orientations, and the positions and orientations of the monitors relative to the position of an operator for a given task of a known type.

Referring to FIG. 1, a multiple camera viewing system 10 under control of a computer 11 is viewing a workspace 12 including at least one robot 13 which is controlled by a human operator 14 from a remote location. The control station which the operator is using includes multiple monitors 15-17, a hand controller 18 for each robot, an image processor 19 (which may include, for example, video image enhancement and/or graphics capabilities), a voice input system 20, keyboards 21, and other computer input devices such as a mouse.

Copending application, Ser. No. 07/716,150, filed Jun. 17, 1991, now U.S. Pat. No. 5,182,641 the disclosure of which is hereby incorporated by this reference, describes a system wherein each time the operator commands a camera motion and specifies which monitor he or she is currently viewing, the hand controllers and perhaps an image processing system adapt to the new camera orientation. The purpose for that is to reduce operator workload by keeping one camera coordinate system aligned with the hand-controller coordinate system. However, in that system, the operator must decide at all times what camera configurations are wanted and must convey these configurations to the system. That mental and physical activity can impose additional workload on the operator. Also, unless all the cameras are parallel in 6 degrees of freedom in the workspace, the hand-controller and monitor coordinate systems cannot all match simultaneously.

In accordance with the present invention, there are introduced three additional capabilities (1) changing the position and orientation of the monitors so that the hand-controller coordinates can match the coordinates of all the monitors (simultaneously), (2) tailoring the system configuration parameters to each individual operator's personal characteristics for the type of task at hand, and (3) using the hand controller and robot position, force and torque measurements to identify the current task, completion of the current task, current operator and current operator performance as judged against previously measured performance of that operator on that task. For systems which can be adjusted by the control station computer, the above information can be used by the system to adjust itself. These new capabilities are intended to further reduce operator workload, not only by freeing the operator of the need to indicate which monitor is currently being viewed, but also of the need to personally command the position and orientation of each camera and monitor, and of the need to remember and command the best arrangement of cameras and monitors and the system configuration (hand-controller gain and coordinate transformation, for example) under which the operator previously performed the current task. For systems which cannot be adjusted by the control station computer, the control station personnel could use all the above information to guide the manual adjustment of the entire system.

Figure 3:
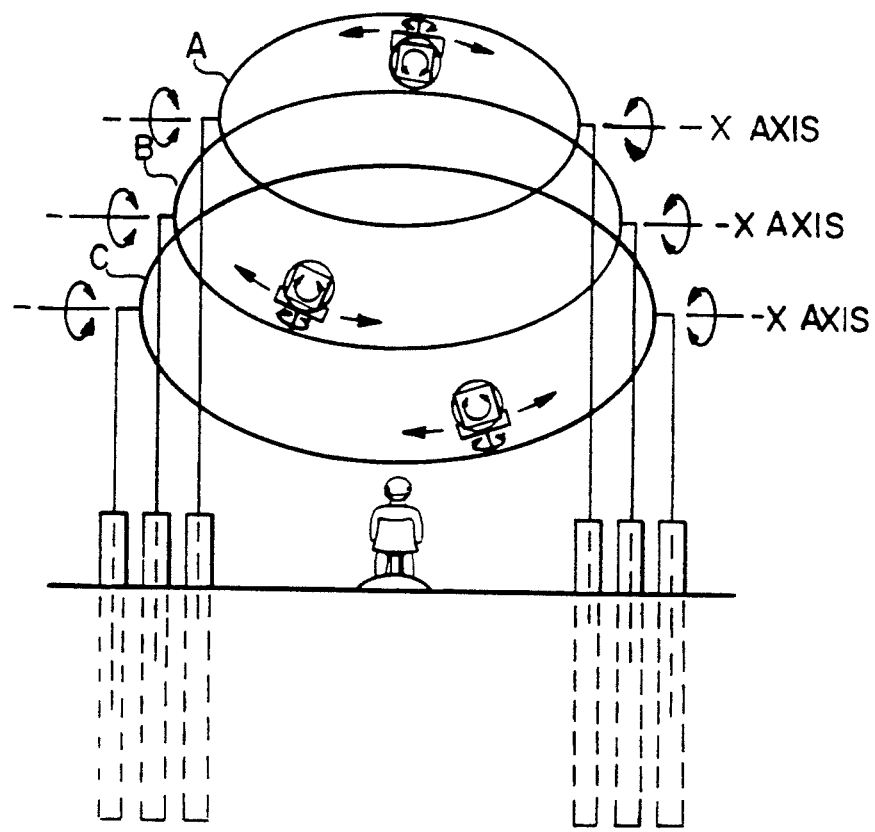
FIG. 3 illustrates diagrammatically an arrangement for effecting the rotation and translation of monitors using three concentric rings supported by telescoping posts.

In order to match the hand-controller coordinates with the coordinates of the camera and the operator's point of view, the solid angle between the straight ahead direction of the robot and the straight ahead line of view of the camera must equal the solid angle between the hand-controller straight ahead direction and the line between the center of the camera image and the observer's point of view. The observer's point of view is best located at the center of a spherical projection screen or the equivalent using television monitors for display. This can also be realized by using a helmet-mounted display system. The aforesaid copending patent application discusses matching hand-controller coordinates with the coordinates of the camera and monitor. In order to match the observer's point of view with the camera view using television monitor displays, the equivalent of a spherical projection screen may be provided using, for example, rings A, B and C centered on the observer, one ring for each monitor, as shown in FIG. 3 (or two monitors for each ring, one for each of two 180° sectors) with a track on each ring for moving the monitor (or two monitors) through 360° (or 180° each) around the observer seated at the center. Each of three separate monitors, AA, BB, and CC (or pair of monitors) may thus be positioned anywhere in a spherical space around the observer.

The viewer will be seated on a chair in the control station, in which case rings would suffice to position each one of the three monitors at any of an allowable set of positions surrounding the operator by raising and lowering and/or turning each ring on the single axis until the ring is at the desired elevation position to match camera tilt and then running the monitor along the track on the ring to the position desired on its ring to match camera pan. "Allowable positions" are all positions except where monitors collide, or where one monitor blocks the operator's view of another monitor. Each monitor is then panned and/or tilted on its carriage (yoke) after it is properly positioned on the ring so that it is perpendicular to the operator's line of sight when the center of the monitor is viewed. Each monitor, or its image, is then rolled to match the camera roll angle. Any sequence including simultaneous occurrence of these adjustments is within the scope of this invention.

The performance of each operator is tested on a variety of classes of tasks under a variety of camera and monitor arrangements with particular system parameters. One process of testing operators and storing television viewing arrangements and system configuration parameters for the best arrangement and configuration as a function of each operator and task type is illustrated in a flow chart shown in FIG. 2. Other testing processes within the scope of this invention will occur to those skilled in the art.

Figure 2:
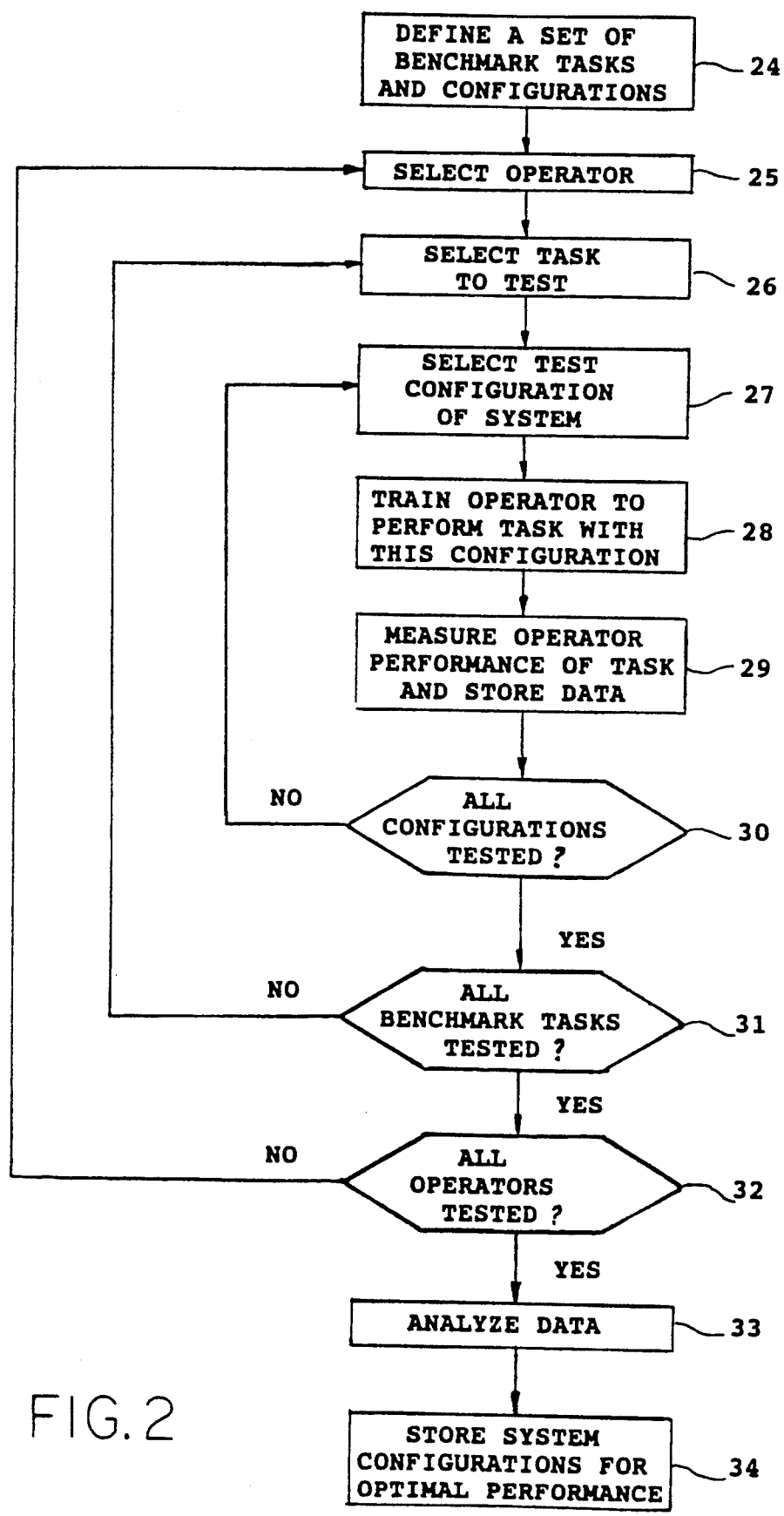
FIG. 2 illustrates a flow chart for the process of testing operators for optimal performance of different types of tasks with different viewing arrangements of cameras and monitors and different configurations of control station parameters, and storing in a control station computer a table of optimal viewing arrangements and configurations of parameters for each type of task for each operator.

Once a set of benchmark tasks, television viewing arrangements, and system configuration parameters are defined in block 24 of FIG. 2, an operator is identified for testing in block 25. The first step of testing is to select a task in block 26. The next step in block 27 is to select a television viewing arrangement and system configuration to be used in the following step in block 28 of training the operator.

The operator's performance is measured and stored in the next step, block 29. Then another television viewing arrangement and set of system configuration parameters are selected in block 27. The sequence of steps in blocks 27 through 29 is repeated until all television viewing arrangements and system configurations to be tested have been tested for the selected task. At that point 30 of the flow chart, a decision is made to proceed to the next point 31 and repeat the steps in blocks 26 through 29 to select, train and measure performance for another task in the same way as for the first task until all of the benchmark tasks have been selected and performance tested. At that point 31 of the flow chart, a decision is made to progress to point 32 in the flow chart.

If all operators have not been tested, the next step is to select another operator in block 25 and the entire process is repeated until all operators have been selected. A decision is then made at point 32 in the flow chart to analyze the stored data in block 33 in order to select the television viewing arrangement of cameras and monitors and system configurations of parameters that produce the best performance for each task by each operator. The best for each task and each operator is stored (box 34) in the control station computer in a separate table for each operator identified with a unique code number for each operator.

Other testing strategies, such as testing all operators on one task before selecting a new task, or testing all operators on one task and system configuration before changing task and configuration, are also anticipated by this application. In FIG. 2, boxes 25, 26 and 27 are interchangeable as long as boxes 30, 31 and 32 are interchanged accordingly. Also, data can be analyzed wherever appropriate. That is, in FIG. 2, box 33 could be located between boxes 29 and 30, between boxes 30 and 31, or between boxes 31 and 32. Thus FIG. 2 shows only one of many testing strategies anticipated by this application.

In FIG. 2, box 27 (Select Test Configuration of System), anticipates that the operator may wish to configure the system into a configuration of his or her own. This system configuration may also be used to test the other operators. An operator may know just what configuration change would make the operation "feel right." However, just because it feels right does not mean that it enables optimal performance. Thus, operator-chosen configurations will be allowed, and tested just like all other configurations.

The testing must be controlled for training effects. A variety of strategies exist which help to accomplish this. One possible testing strategy is to split the number of test trials for each combination of task and configuration so that half of the trials are performed at the beginning of testing and half at the end. For example, if three sets of viewing arrangements and parameter configurations (A, B, and C) are being tested for one task, they can be tested in the order (A, B, C, C, B, A), with half of the trials of A first, half of the trials of A last, half of the trials of B second, half of the trials of B fifth, half of the trials of C third and half of the trials of C fourth (with the appropriate rest periods between them).

If the performance of the second half of trials of A (or B or C) is significantly better than the performance of the first half of trials of A (or B or C), then task A (or B or C) may still be being learned, i.e., training may not have been completed. Another set of the identical tests (A, B, C, C, B, A) may be in order. In some cases, a particular task will always improve with additional experience. In that case, the benefits of the additional experience is shared between the three sets A, B, and C. Interaction effects may also exist. These could be controlled by testing sets in a sequence C, B, A, A, B, C, for example, and comparing the results to the testing of the sets in the sequence A, B, C, C, B, A.

Fatigue can be taken into account by comparing the performance of the first half of a test sitting with the performance of the second half. For example, suppose one trains and tests with a total of twenty repetitions of each task within each of the sets A, B and C, i.e., 10 of A, 10 of B, 10 of C, 10 of C, 10 of B and 10 of A, with appropriate rest periods between sets of ten. Training effects are measured by comparing the performance of trials 1-10 of A (or B or C) against the performance of trials 11-20 of A (or B or C). The fatigue effects are measured by comparing the performance of trials (1-5 and 11-15) against the performance of trials (6-10 and 16-20) or A (or B or C). If the performance of (1-5 and 11-15) is better than the performance of (6-10 and 16-20), then the operator may well be suffering fatigue by having to perform the task ten times in one sitting. In that case, it may be best to test only five trials in one sitting and have four sittings per set of viewing arrangements and parameter configurations for each task combining both tests; i.e., A, B, C, C, B, A, C, B, A, A, B, C.

Optimal performance might differ for each task and therefore needs to be defined for each task. For example, in future applications, such as teleoperated or robot-assisted brain surgery, minimal cutting of blood vessels and cortical tissue might be part of optimal performance, but for appendix removal minimal surgical time (to avoid rupture of the poison-filled appendix) might be optimal, while the cutting of blood vessels might be relatively unimportant. The measuring of optimal performance might include such measurable quantities as task completion time, number of undesired collisions, workload (fatigue, heart rate, verbal reports, etc.), amount of robot power used, amount of forces/torques measured by the robot end-effector force/torque sensors, and the number of false starts, etc.

In this manner, camera arrangements and system configurations that optimally enhance each individual operator's performance for each class of tasks can be determined and stored in the control computer memory.

For example, many people have stereo vision anomalies. Some people have high stereo acuity for the region of space beyond their fixation point but are stereo blind for the region of space in front of their fixation point. For such people, the system could provide a camera arrangement where all pertinent information is presented behind the operator's most natural fixation point. This could be done simply by converging the stereo television cameras to slightly in front of the critical area of the workspace for that particular task. Now, a highly skilled astronaut who just happens to have the stereo vision anomaly just described, would still be an ideal candidate for performing teleoperation with a stereo viewing system.

The left brain/right brain dichotomy between people suggests that certain people will perform better with cameras set to view the workspace from perspective vantage points while others perform better with orthogonal cameras. Thus, two cameras viewing the workspace at angles of, for example, $+15°$ and $-15°$ with each view presented to one of two monitors located side-by-side in front of the operator, one rotated $+15°$ and the other rotated $-15°$, might provide the right-brain operator with exactly what that operator needs to perform a class of tasks optimally. A left/brain operator might not be able to perform well at all with this two-camera arrangement and may desire three cameras, one looking from above, one from one side and one from the front. The monitors might then best be placed with the top view placed above the front view monitor and the side view monitor alongside the front view monitor. That three-camera orthogonal arrangement is a television approximation to the classic orthogonal projection of mechanical drawings showing the top, front and side views of an object.

The term "television approximation" is used advisedly because a true orthogonal projection is not given by a television image display. In a television image display, two lines overlap if they each point directly toward the front nodal point of the camera lens, but in orthogonal projections two lines overlap only if they are perpendicular to the projection. This is an important difference and may prove to be the source of many operator errors when using a three-camera orthogonal arrangement. This point must not be overlooked because in the literature many authors assume that orthogonal television cameras can provide all the depth information an operator can possibly need in the plane of the two camera axes. However, by testing each operator's performance on a variety of tasks and under a variety of viewing conditions, including perspective and orthogonal views, it may be found that many operators perform better with perspective views while many others perform better with orthogonal views. It may also be found that the same person performs best with orthogonal views for one class of tasks, perspective views for another class of tasks, and a combination of the two for yet another class of tasks.

Certain operators may prefer high hand-controller gain for large robot movements and lower gain for fine movements. Other operators may become confused by changes in hand-controller gain and may prefer an intermediate gain at all times. With the present invention, each operator will always have the most desirable hand-controller gain for each overall task and also for each phase of each task. For example, if one task requires a large motion followed by several very precise motions, the present invention may provide, at the operator's command or automatically, a preselected optimal large initial hand-controller gain followed by a preselected optimal small gain as appropriate to that particular task and operator.

This type of task might include picking up an object from one position, moving it a long distance and then placing it in a very precise final position. Consequently, for the present invention an overall task is broken down into the separate task types for each phase so that picking up an object is one type of task. Transporting the object from point A to point B along a straight line in the workspace is another class or type of task, and transporting it between the same two points along a broken path yet another type. Then positioning the object at point B may be yet another type, and affixing it in the new position still another type, depending upon how it is to be affixed, such as threading the object into a tapped hole, or inserting and turning the object in a manner similar to a key inserted into a lock.

Certain operators may desire a lot of graphical information on the monitor when performing a task. Other operators may find too much information on the monitor to be distracting. One operator may be green color blind while another may be red color blind. Graphic and color displays must be selected and presented accordingly. One operator may perform best when the graphic information flashes on the monitor every 20 seconds while another operator may perform best when the graphic information flashes every 5 seconds. Many more parameters for the system configurations will occur to one skilled in the art.

It is recognized that the internal states of people change. For example, the operator may suddenly feel tired, or become frustrated as he or she thinks about something in their personal life. Or an operator may have just drank a particularly strong cup of coffee. In any case, as the internal state of the operator changes, the operator may not perform well with a television viewing arrangement or a system configuration which previously worked very well for him or her. In this case, it is desirable to allow the operator the option to override the automated television viewing arrangement or system configuration selection at any time, including the initial arrangement and configuration.

The operator may wish to use a different stored arrangement or may wish simply to adjust one camera or monitor, or may wish to adjust hand-controller gain or to make major adjustments in the system configuration. The operator may further wish to store any number of new arrangements and configurations for future use. Therefore, the system allows such operator override by allowing the operator to command any available system changes through the available operator input devices. This includes the capability to adjust any and all television viewing arrangements and system configuration parameters. Thus, a camera and control station system optimal for a specific task during testing may not always be optimal for that operator and task, depending upon human factors, such as discussed above. Also, unexpected scenarios may arise. Consequently, the operator must be able to override the automated system through a voice controller 20 or other input device, such as the keyboard 21 (or a mouse), whenever it is deemed necessary.

The testing variables can include a number of operator internal states (such as exhaustion, stress during an emergency situation, etc.). The system would then store optimal viewing arrangements and system parameter configurations for the individual internal operator states. The operator could later call up these sets of viewing arrangements and parameter configurations by identifying his or her current internal state.

The system could poll the operator each day as to which internal state the operator is experiencing to select the initial set of viewing arrangements and parameter configurations. The operator could then inform the system of a change of internal state by voice or other input device at any time. In addition, the system could test the operator with preliminary trial tasks to determine today's operator characteristics and identify the initial internal state.

The variables which contribute to operator workload are not currently fully understood. Individual differences certainly exist. The present invention will aid in minimizing workload on an individual basis by tailoring the viewing arrangement (cameras and monitors) and configuration control station system parameters to fit the individual's previously determined conditions of optimal performance during a training and test period prior to a mission that will entail expected classes or types of tasks. As suggested hereinbefore, a general task may be broken down into a number of different types of tasks. By classifying such different types of tasks, the operator may carry out the execution of any general task to be performed by selecting, through the control station computer, a sequence of arrangements of cameras and monitors and system parameter configurations for the corresponding sequence of task types. The selection for each task type is made from a previously stored table compiled for the types of tasks and the individual operator.

During any point in time of actual work operations, the operator may still be learning to use the system. Therefore, after training and testing is completed, the system would continually measure the operator's performance and update the operator's optimal system tables in order to take advantage of the operator's improvement through added experience.

It is well known and widely practiced in the art of teleoperation to sense the joint locations of the robot and the hand controller. It is also well known in the art to sense the forces and torques experienced at the gripper end of the robot arm. A new use for this information by the control station computer 11 in this invention is (1) to identify the current task type, e.g., in order to insure that the optimal system configuration for the current task and operator is currently being used, (2) to identify the current operator, e.g., in order to insure that the new operator did not forget to identify himself or herself, and (3) to identify the completion of a current task, e.g., in order to change the television viewing arrangement (cameras and monitors) and system configuration (parameters) for the next task type. As an example, if the current task is the screwing in of a bolt, by measuring the torques exerted on the robot gripper the system can determine when the bolt is securely fastened (similar to a torque wrench).

If the next task is to move the robot across the workspace to replace the screwing tool in the tool box, the system can automatically change the zoom lens power, for example, from close-up to wide angle. The system can attempt to identify the operator by knowing the characteristics of each operator's work style (for example, if one operator works slowly and rarely bumps things in the workspace and another works quickly and bumps things in the workspace to help determine exactly where the robot gripper is).

The system could determine, in real time, which type of task the current task falls into. This can be done by the control station computer by monitoring the workspace and the system parameters, for example, by machine vision measuring the angular velocity of a spinning satellite about to be grasped, or by using the position, force and torque information. The system could use this information to continue to measure the operator's performance, inform the operator when he or she is not performing as well as usual, suggest an alternate viewing arrangement and/or parameter configuration, and update the operator's table of optimal viewing arrangements and parameter configurations. The system could inform the operator that the current viewing arrangement and/or system configuration is not optimal, as determined by the operator's earlier tests, or by the operator's current performance.

Once the table for an identified operator has been compiled of arrangements of the television viewing system and configurations of the control system parameters that yield the operator's optimal performance for each type of task and stored in the control computer memory, the operator need only identify himself or herself to the computer through a computer keyboard or other input device. The operator may thereafter call up the television viewing arrangement and system configuration for each subsequent task to be carried out. The computer then controls the positioning and orientation of the cameras, the positioning and orientation of corresponding monitors and all other station parameters.

As discussed above, in a teleoperator work station where movable cameras are viewing the workspace, any panning, rolling or tilting of the cameras causes a misalignment between the coordinate system of the camera and the coordinate system of the operator viewing the monitor. This causes the operator to continuously transform coordinates mentally during operation. If several movable cameras are presenting their images to several monitors, each may require a different coordinate transformation. One can do away with all these internal operator transformations and match all the monitor and camera coordinates by rotating each monitor to match the solid viewing angle of its corresponding camera, and by relocating the monitor so that the operator views the center of the monitor perpendicularly. That is, the solid angle between the straight ahead direction of the robot and the straight ahead line of view of the camera must equal the solid angle between the hand-controller straight ahead direction and the line between the center of the camera image and the observer's point of view.

Figure 4:
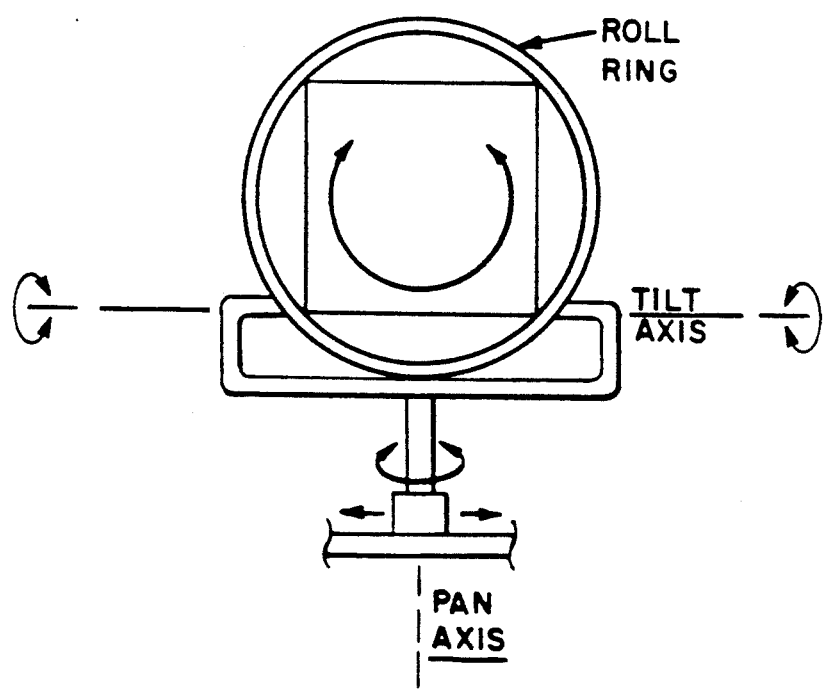
FIG. 4 illustrates diagrammatically the manner in which each monitor is mounted on a track in a ring as shown in FIG. 3 using a carriage for rotating and tilting each monitor on its ring.

There are at least three possibilities for effecting the rotation and translation of the monitors. A first possibility is for each monitor to be mounted on an automated platform which pans, tilts, rolls and shifts with the camera whose image it is displaying. For example, in FIG. 3 three concentric rings are provided in such a manner that each ring can be raised and lowered by telescoping posts and rotated independently about the X-axis drawn horizontal in the figure. Each monitor may be rotated, panned and tilted using a yoke shown in FIG. 4. Each monitor is mounted in a track for positioning on each ring, and each monitor is flat so that the rings can pass each other without the monitors colliding. The "home" position height of the rings is chosen so that the operator's eyes are level with the centers of the monitors when the monitors are not tilted (in a vertical plane). If the camera displayed on the innermost ring is panned 45° to the left and tilted 20° upward, the innermost ring would rise upward a distance equal to the ring radius times the tangent of 20°, and its monitor would be rotated 45° to the left on the ring and tilted 20° downward on its carriage or yoke. The operator now views the innermost monitor perpendicularly at the same angle that the camera views the workspace. The ring would be rotated about its X axis if the camera angle is greater than the maximum angle that can be achieved by raising and lowering the ring. For example, if a camera looks straight up. As a second possibility, a spherical projection screen and system could be used and the projection of each monitor image relocated accordingly, and, as a third possibility, a helmet-mounted display could be used.

In the example given above, if the hand controller is operated "forward," the camera will see the robot move 45° to the right and 20° downward, the monitor will show the robot move 45° to the right and 20° downward on the screen, but the monitor is rotated 45° to the left and 20° upward so that the robot motion is presented in the forward direction. In this manner, the operator does not need to mentally transform coordinates.

In the event that one monitor obscures the view of another, either or both of the monitors can be shifted the minimal amount necessary to avoid the obscuration. Each monitor-to-ring mounting apparatus also serves as a gimbal. In this manner, the shifted monitor or monitors can be further rotated so that the angle of each monitor once again matches the viewing angle of its camera. In this case, the operator will not view the monitor exactly perpendicularly, but the error will be greatly minimized. The error can be displayed graphically on the monitor so that the operator is aided in making the remaining necessary internal coordinate transformation.

By rotating and relocating the monitors as described above, the coordinate systems of all the monitors will match simultaneously. The hand-controller coordinates need only be transformed to match the monitors' coordinates. If the hand controller is not movable, then one solution is to fix the hand controller in the control station so that pushing the hand controller straight ahead in the control room moves the robot directly away from a camera located directly behind the robot in the workspace, and placing the image of that camera on a monitor located directly in front of the operator, such that the monitor is viewed perpendicularly by the operator. This is also part of the "home" position configuration.

By moving cameras and monitors as described above, the operator may feel that the monitors are movable windows, and through each window is the corresponding view of the robot workspace as seen through a window located at the camera location. Alternatively, the operator may feel that there are many identical robot workspaces, and all move identically in unison as seen through many monitor windows. When a monitor moves, its workspace moves accordingly so that it is seen from a new angle corresponding to the camera's new viewing angle. But in all the windows, all the workspaces are seen with parallel coordinate systems so that North, East, up, etc., all match in all the views.

If the hand controller can be rotated, for example, if it is attached to an operator swivel chair, then as the operator rotates, the hand-controller's coordinates rotate, but the signals coming out of the hand controller and sent to the robot arm are unchanged. For example, suppose in the home position, "straight ahead" is due North in the control station and due North in the robot workspace. If the operator swivels 90° to the East and then pushes the hand controller straight ahead with respect to the swivel chair (i.e., East), the robot arm will still move due North. None of the cameras have moved, and so none of the monitors have moved. Thus, all the monitor images will show the robot arm moving due North in the control station (just as before the swivel motion of the operator) which still corresponds to due North in the robot workspace. If the operator is viewing a monitor directly in front of him or her, that is due East, the operator will see the robot arm move from the right side of the monitor towards the left side of the monitor, that is perpendicular to the hand-controller motion the operator is making. Thus, the hand-controller coordinates and the monitor coordinates no longer match. The solution is to transform the hand-controller coordinates as a function of the motion of the swivel chair so that when the chair faces due East, forward (due East) motion of the hand controller will move the robot arm due East. If the operator now swivels to the left 40° (that is facing 50° East of North), the hand-controller coordinates must be transformed 40° to the left so that pushing the hand controller straight ahead will cause the robot arm to move 50° East of North. If the operator has the ability to tilt the chair upwards and downwards, the hand-controller coordinates must also tilt accordingly to keep all the hand-controller coordinate systems matched.

Even with a fixed hand controller, hand-controller coordinate transformations may be desirable. This is because operators may not define their coordinate system with respect to the chair, but maybe with respect to their direction of gaze, etc. Such an operator might want the option to tell the control station computer which monitor he or she is viewing and want a straight ahead motion of the hand controller to move the robot in the direction of that monitor's corresponding camera's line of view. This may cause confusion, however, for if the operator's chair faces North (in the example above), but the operator views a monitor 50° East of North and commands the computer to make the corresponding hand-controller coordinate transformation, then as the operator pushes the hand controller North, the robot will move 50° East of North (to match the monitor's camera). Now the operator has a difference between his or her visual (monitor) coordinate frame and his or her kinesthetic (hand-controller) coordinate frame, which can be confusing. However, for high precision work, this may be desirable and is anticipated by this patent application.

Some operators may desire a mismatch between their visual coordinate system and their kinesthetic coordinate frame. For example, consider the golfer who always aims slightly to the left when hitting the ball because it always goes slightly to the right of where he or she aims it. This may occur in teleoperation also, in which case the operator has the option to transform the hand-controller coordinates to correct for his or her visual-kinesthetic error. This is also anticipated by this patent application.

I claim:

1. In a real-time video presentation system for robotics and teleoperation using a hand-controller, said system having movable television cameras for optimal viewing of a region of interest surrounding a robot and movable monitors in a control station remote from said robot for presentation of television images from said cameras, a method of rotating each of said monitors to match the orientation of its corresponding television camera by matching its corresponding camera orientation in pan, tilt and roll, thereby causing an angle between a straight ahead direction of said robot and a straight ahead line of view of said corresponding camera to equal an angle between said hand-controller straight ahead direction and a line between the center of the image on a monitor of said corresponding camera and an observer's point of view.

2. A system as defined in claim 1 including a method of relocating each of said movable monitors with respect to an operator to enable said operator to view the center of each monitor's screen perpendicularly, thus enabling said operator to view each of said television images in a direction corresponding to the viewing angle of a corresponding one of said television cameras providing said television image, and thereby matching all rotational coordinates of all cameras and monitor images.

3. In a real-time video presentation system as defined in claim 2, further comprising a robot in said region of interest and a hand controller in a workstation for control of said robot, a method of mounting said hand controller in a fixed position, and transforming coordinates of said hand controller to correspond with coordinates of a camera located directly behind said robot in said region of interest providing one of said television images to a monitor located directly in front of said operator, whereby pushing said hand controller straight ahead by said operator at said control station moves said robot directly away from said camera providing one of said television images to said monitor.

4. In a real-time video presentation system as defined in claim 2, further comprising a robot in said region of interest and a hand controller in a workstation for control of said robot, a method of fixing said hand controller relative to a rotating position of said operator, transforming coordinates of said hand controller to match coordinates of all said monitor images, wherein said operator rotates in position a finite angle, and rotating said coordinates of said hand controller through said finite angle, thereby to maintain a match between coordinates of said hand controller and coordinates of said monitor images.

5. A method as defined in claim 4 wherein visual-kinesthetic error of said operator is corrected by said hand controller and correction is effected by mismatching coordinates otherwise matched to coordinates of said monitor images.

6. A method as defined in claim 5 further comprising a method of graphically displaying an extent to which said coordinates do not match due to correction effected by mismatching coordinates otherwise matched to coordinates of said monitor images.

7. A method as defined in claim 2 further comprising a method to avoid obscuring the view of one monitor from said operator by another monitor, said method comprising shifting and rotating both said one monitor and said other monitor so that all of each monitor can be viewed perpendicularly by said operator.

8. In a real-time video presentation system as defined in claim 2, further comprising a robot in said region of interest and a hand controller in said workstation, a method of transforming coordinates of said hand controller to mismatch coordinates of said monitor images, whereby pushing said hand controller straight ahead by said operator in said control station moves said robot directly away from a selected camera providing a television image to a monitor selected by said operator for viewing, for example, for special situations, such as high precision or difficult work.

9. A method as defined in claim 8 further comprising a method of graphically displaying an extent to which said coordinates do not match due to correction effected by mismatch of coordinates otherwise matched to coordinates of said monitor images.

* * * * *